(12) United States Patent
Johnston et al.

(45) Date of Patent: Mar. 10, 2020
(10) Patent No.: US 10,586,186 B2

(54) FOG DRONE FLEET ORCHESTRATOR

(71) Applicant: Cisco Technology, Inc., San Jose, CA (US)

(72) Inventors: Jay Johnston, Raleigh, NC (US); Rama Darbha, Raleigh, NC (US); David C. White, Jr., Durham, NC (US); Magnus Mortensen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 438 days.

(21) Appl. No.: 15/147,605

(22) Filed: May 5, 2016

(65) Prior Publication Data
US 2017/0323235 A1   Nov. 9, 2017

(51) Int. Cl.
G06Q 10/06    (2012.01)
B64C 39/02    (2006.01)
G05D 1/10     (2006.01)
H04W 4/00     (2018.01)
H04L 29/08    (2006.01)
H04W 4/38     (2018.01)

(52) U.S. Cl.
CPC ...... *G06Q 10/06311* (2013.01); *B64C 39/024* (2013.01); *G05D 1/104* (2013.01); *H04L 67/12* (2013.01); *H04W 4/00* (2013.01); *H04W 4/38* (2018.02); *B64C 2201/126* (2013.01); *B64C 2201/127* (2013.01); *B64C 2201/143* (2013.01)

(58) Field of Classification Search
None
See application file for complete search history.

(56) References Cited

U.S. PATENT DOCUMENTS

| | | |
|---|---|---|
| 5,521,817 A | 5/1996 | Burdoin et al. |
| 8,352,112 B2 | 1/2013 | Mudalige |
| 8,543,255 B2 | 9/2013 | Wood et al. |
| 9,102,406 B2 | 8/2015 | Stark et al. |
| 2004/0030570 A1 | 2/2004 | Solomon |

(Continued)

OTHER PUBLICATIONS

Shim et al., "Hierarchical Control System Synthesis for Rotorcraft-Based Unmanned Aerial Vehicles", AIAA Guidance, Navigation, and Control Conference and Exhibit, Aug. 14-17, 2000, Denver, CO, USA, 9 pages. <http://robotics.eecs.berkeley.edu/~sastry/pubs/SastryAllJuly07/SastryALL/2000/ShimHierarchical2000.pdf>.

(Continued)

*Primary Examiner* — Matthew S Gart
*Assistant Examiner* — Camille M Galloway
(74) *Attorney, Agent, or Firm* — Patterson + Sheridan, LLP (57) ABSTRACT

Embodiments herein describe a fog drone that selects, organizes, monitors, and controls a plurality of drones in a fleet. The fog drone receives a job to be completed from a dispatcher and identifies the resources for accomplishing the job such as the amount of material (e.g., fiber optic cable) or the type of drones (e.g., drones with RF antennas or digging implements) needed to execute the job. Using the identified resources, the fog drone estimates the number of drones needed to complete the job and can recruit available drones to form the fleet. Once the fleet is formed, the fog drone determines a number of drones to place on standby to replace active drones if those drones need to recharge or malfunction.

20 Claims, 5 Drawing Sheets

(56) References Cited

U.S. PATENT DOCUMENTS

| | | | |
|---|---|---|---|
| 2015/0234387 A1* | 8/2015 | Mullan | G05D 1/104 |
| | | | 701/3 |
| 2016/0204978 A1* | 7/2016 | Anderson | H04B 7/18506 |
| | | | 370/225 |
| 2016/0293018 A1* | 10/2016 | Kim | G08G 5/0082 |
| 2016/0307449 A1* | 10/2016 | Gordon | G08G 5/0069 |
| 2016/0328979 A1* | 11/2016 | Postrel | B64C 39/024 |

OTHER PUBLICATIONS

U.S. Appl. No. 14/706,797, entitled "Sensor Data Broker for Directed Collection of Sensor Data Between Mobile Collector Device and Sensor Consumer", filed May 7, 2015.

* cited by examiner

FOG DRONE FLEET ORCHESTRATOR

TECHNICAL FIELD

Embodiments presented in this disclosure generally relate to controlling a fleet of drones and more specifically, to using a fog drone to direct the fleet.

BACKGROUND

The use of drones (i.e., unmanned vehicles) has exploded in the last decade. As drones become more sophisticated and commonplace, using the drones for jobs like surveying property, delivering or picking up packages, providing additional cellular network coverage becomes feasible. Many jobs require only one drone which works independently to accomplish the job. However, more complicated or larger jobs will require multiple drones. For example, building a structure may require drones to carry material, dig a foundation, remove previous structures, etc. The drones will likely be specialized to perform these various tasks efficiently. Creating and organizing a fleet of independent drones to work together to perform a job is difficult and complicated.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an autonomous fog drone that includes a processor and a memory comprising at least one application configured to perform an operation. The operation includes receiving a job from a dispatcher, determining a number of drones required for performing the job, and transmitting a request to recruit drones to form a drone fleet. The operation also includes adding a first drone to the drone fleet thereby incurring a monetary cost for leasing the first drone. The operation includes, upon determining the first drone in the drone fleet is no longer needed, releasing the first drone from the drone fleet.

Another embodiment presented in this disclosure is a method that includes receiving a job from a dispatcher, estimating a number of drones required for performing the job, and transmitting a request to recruit drones to form a drone fleet. The method also includes adding a first drone to the drone fleet thereby incurring a monetary cost for leasing the first drone. The method includes, upon determining the first drone in the drone fleet is no longer needed, releasing the first drone from the drone fleet.

Another embodiment presented in this disclosure is a system that includes a drone fleet comprising a plurality of autonomous drones and an autonomous fog drone configured to monitor and control the drone fleet. The fog drone is configured to receive a job from a dispatcher, determine a number of drones for performing the job, and transmit a request to recruit drones to form the drone fleet. The fog drone is configured to add a first drone to the drone fleet thereby incurring a monetary cost for leasing the first drone. The fog drone is configured to, upon determining the first drone in the drone fleet is no longer needed, release the first drone from the drone fleet.

Example Embodiments

Embodiments herein describe a fog drone that selects, organizes, monitors, and controls a plurality of drones in a fleet. The fog drone (also referred to as a master or leader drone) receives a job to be completed from a dispatcher. The fog drone identifies the resources required to accomplish the job. For example, the job may be laying fiber optic cable or providing cell network coverage for special sports event. In these examples, the fog drone identifies resources such as the amount of material (e.g., fiber optic cable) or the type of drones needed (e.g., drones with RF antennas or digging implements). Using the identified resources, the fog drone determines the number of drones needed to complete the job within certain parameters (e.g., a predefined time period or cost constraint). In one embodiment, the fog drone determines a number of drones to use in an active state and a number to leave in standby (or backup) states.

Once the number and type of drones are identified, the fog drone recruits drones using, e.g., an advertising message or a drone broker. Once an available drone is found that matches the requirements for the job, the fog drone adds the drone to the fleet. The fog drone monitors the fleet as the drones work to complete the job. By having standby (or backup) drones, the fog drone can substitute a standby drone for an active drone if, for example, the battery or fuel supply of an active drone runs low, the drone exhausts its material (e.g., runs out of fiber optical cable), or the drone malfunctions. Moreover, the fog drone can send updates to the dispatcher estimating when the job will be complete. As tasks are completed and certain drones are no longer required, the fog drone may release the drones working on those tasks from the fleet. Moreover, the fog drone may calculate a monetary cost for leasing the released drone during the time the drone was in the fleet. Once all the tasks of the job are finished, the fog drone releases the remaining drone and informs the dispatcher.

Figure 1:
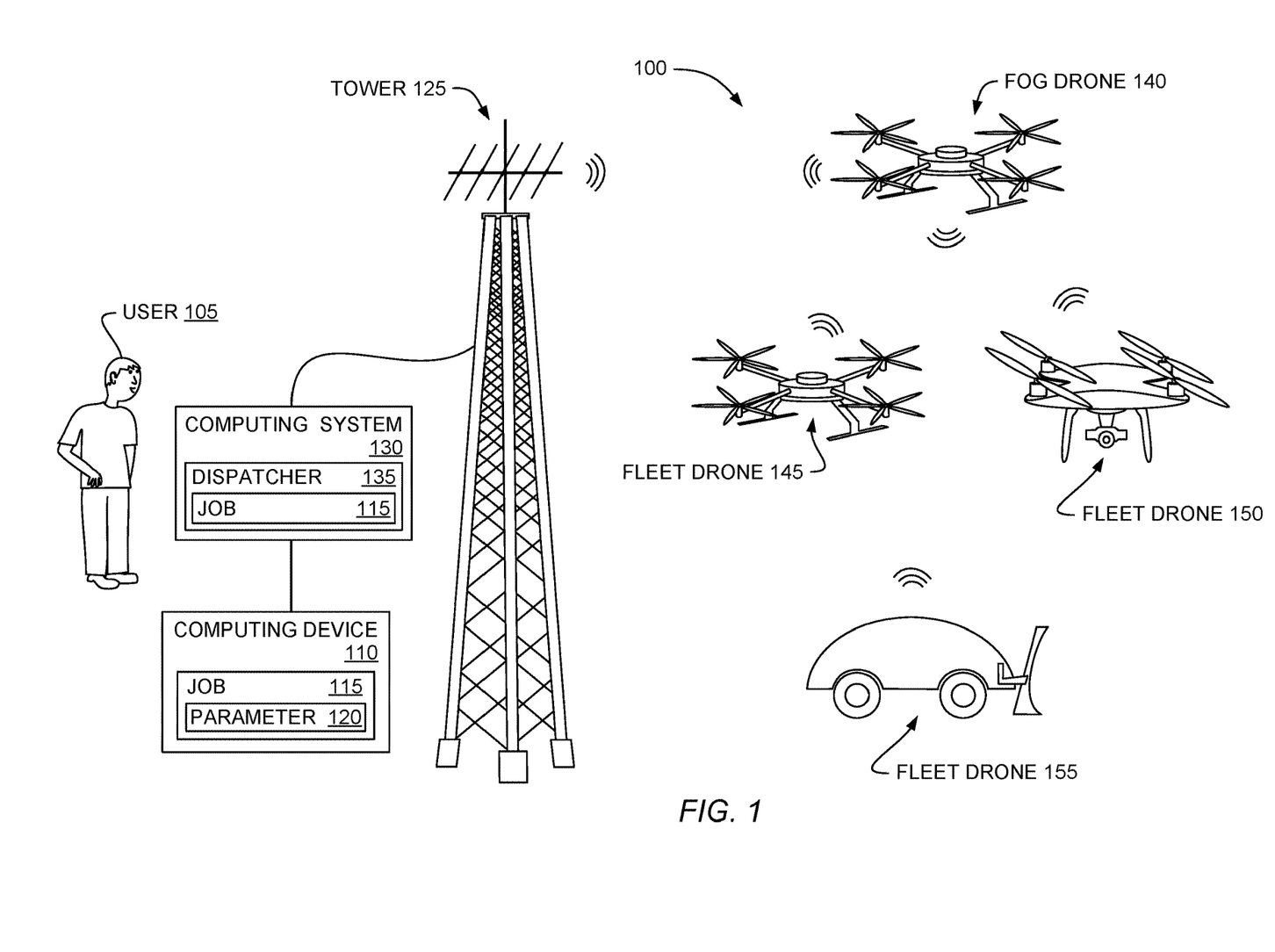
FIG. 1 illustrates a drone fleet controlled by a fog drone, according to one embodiment described herein.

FIG. 1 illustrates a drone fleet 100 controlled by a fog drone 140, according to one embodiment described herein. In addition to the fleet 100, FIG. 1 illustrates a user 105, computing device 110, communication tower 125, and computer system 130. Using computing device 110, the user 105 defines a job 115 to be completed by the drone fleet 100. The computing device 110 may be a personal computing device (e.g., a desktop, laptop, mobile device, etc.) which uses a web browser or specialized application to define the job 115. Generally, the job 115 can be any job that uses multiple drones to complete. Example jobs 115 include laying fiber optic cable, building a structure, surveying a property, providing cellular network coverage, removing debris, delivering material, and the like. The job 115 may indicate what is to be performed (e.g., blue prints or instructions) and the location of the job.

When defining the job 115, the user 105 can also enters parameters 120 for completing the job 115 which constrain when or how the drone fleet 100 performs the job 115. The parameters 120 may indicate the time when the job 115 should be complete, the maximum cost of performing the job 115, limitations on what time of day the work can be done (to avoid noise restrictions), and the like. The computing device 110 transmits the job 115 and its parameters 120 to computing system 130.

Computing system 130 includes a dispatcher 135 which receives and transmits the job 115 to a selected autonomous fog drone 140. For example, the dispatcher 135 (e.g., a software application) may maintain a list of available fog drones and transmit the job 115 to one of the available fog drones 140. In one embodiment, each fog drone may be configured to perform a certain type of job or jobs. The dispatcher 135 may match the job 115 with a fog drone 140 capable of organizing the drone fleet 100 to accomplish the job. For example, one fog drone may specialize in laying underground cable or pipes such as fiber optic cable, telephone lines, sewage lines, power lines, or drainage pipes, while a second fog drone specializes in expanding cellular networks using drones. Based on the job 115, the dispatcher 135 selects the appropriate fog drone 140.

The communication tower 125 provides bidirectional communication between the dispatcher 135 and the selected fog drone 140. Unlike drone fleets that are controlled by a central command (e.g., by the dispatcher 135), the drone fleet 100 is controlled by the fog drone 140 which is autonomous—i.e., not directly controlled by a human operator. That is, once the job 115 (and parameters 120) are sent to the fog drone 140, the drone 140 decides how to perform the job by, e.g., determining the resources needed, determining the number and type of drones needed, recruiting the drones, deciding which drones should be active and which should be standby, monitoring the drones to change assignments or change the size of the fleet, and releasing the drones from the fleet. The different functions performed by the fog drone 140 are described in more detail below.

As shown, the drone fleet 100 includes the autonomous fog drone 140 and multiple fleet drones (also referred to as member drones). The drone fleet 100 can include unmanned aerial vehicles (UAV) like drones 145 and 150 or autonomous wheeled vehicles such as drone 155. In this example, all the drones in the fleet 100 are unmanned and are controlled by instructions transmitted by the fog drone 140. For example, the fog drone 140 may instruct the fleet drone 155 (which is equipped with a blade) to clear a plot of land. The fog drone 140 can instruct the drone 150 (e.g., a lifter drone) to set building materials at a location in the plot cleared by drone 155. Furthermore, the fog drone 140 may use the drone 145, which may include a camera, to capture images of the worksite which are processed by the fog drone 140 to determine progress and provided updated instructions to the member drones in the fleet 100.

In one embodiment, the fog drone 140 provides status updates to the dispatcher 135. For example, the parameters 120 may indicate the user would like the job 115 completed within two hours. The fog drone 140 may have recruited the number of drones to ensure the job 115 is completed by the user-defined time frame. However, if the fleet 100 encounters bad weather or other factors that slow down work, the fog drone 140 may calculate a new timeline which is provided to the dispatcher 135 and can be forwarded to the user 105.

Once the job is complete, the fog drone 140 releases the fleet drones 145, 150, and 150 so that they can be used for other jobs. In one embodiment, the fog drone 140 may lease the fleet drones 145, 150, and 155. Use of each drone may correspond to a different monetary cost. When a user 105 submits the job and the fog drone 140 estimates the number of drones required to complete the job 115 within the parameter 120, the user 105 may approve the cost or change the parameters 120 (which may mean less drones are needed) to reduce the cost.

Figure 2:
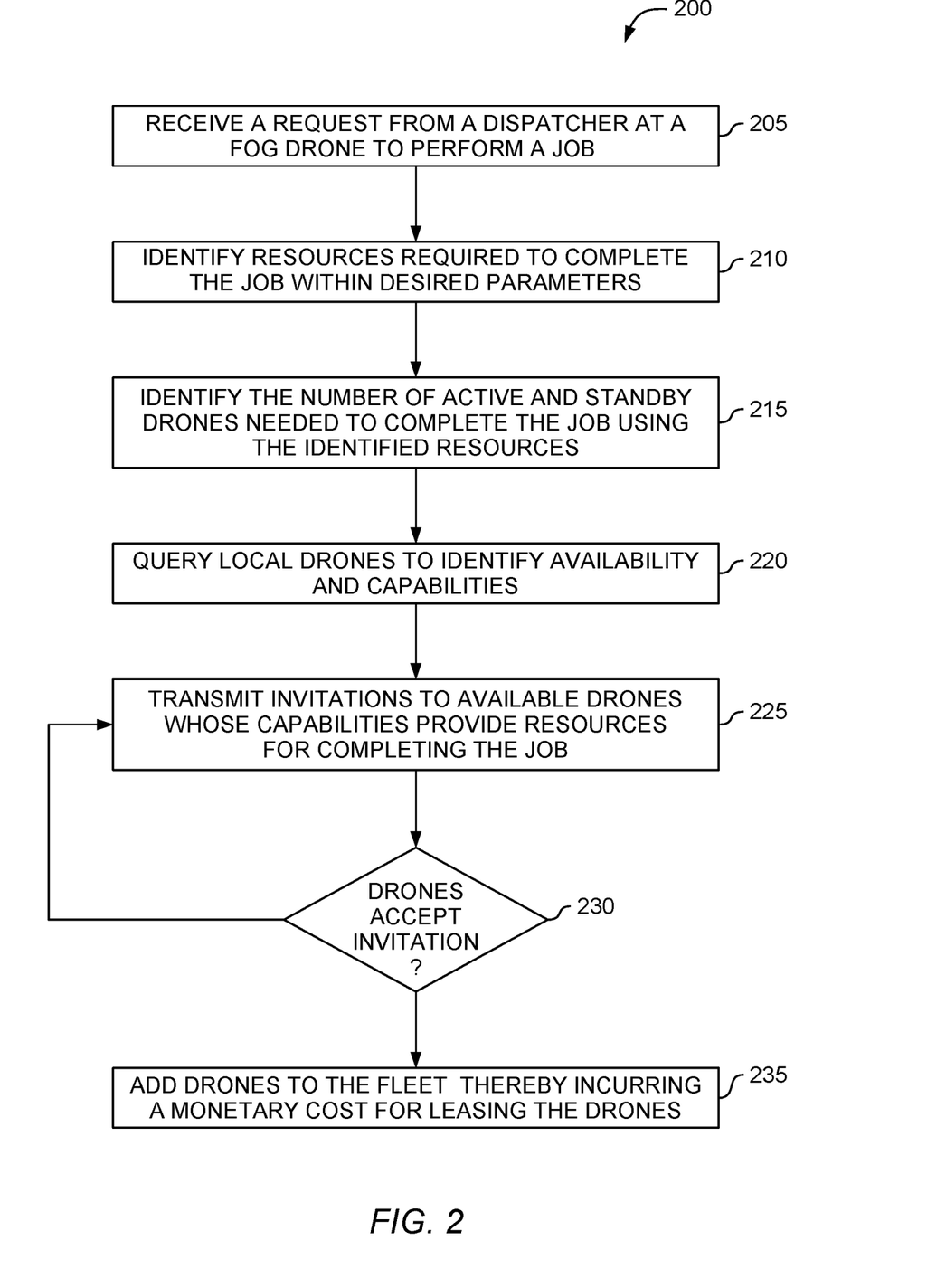
FIG. 2 is a flowchart for recruiting drones into a fleet, according to one embodiment described herein.

FIG. 2 is a flowchart of a method 200 for recruiting drones into a fleet, according to one embodiment described herein. At block 205, the fog drone receives a request from a dispatcher to perform a job. In one embodiment, the job is user defined and describes a job (which includes one or more tasks) to be performed at a particular location (e.g., construct a building, deliver materials, demolish and remove a structure, plant a field, provide cellular coverage, survey a property, etc.). The details for performing the job such as identifying tasks (i.e., a portion of the job), assigning drones to accomplish the tasks, monitoring the drones, selecting active and standby drones, adding drones to the fleet, and releasing drones from the fleet are left to the fog drones. Thus, the dispatcher does not need to develop a detailed plan for executing the job; instead, this is left to the fog drone.

The job may also include parameters or constraints that aid the fog drone to determine how and when to accomplish the job. For example, a time parameter may indicate when the job should be completed which changes how many drones the fog drone recruits. Recruiting fewer drones may reduce costs but the job may take longer to complete. In another example, the parameters include a desired cost which may increase or decrease the number of drones in the fleet and the amount of time needed to complete the job.

At block 210, the fog drone identifies resources required to complete the job within the desired parameters. The fog drone may include a computing system with one or more processors and memory for performing the functions described herein. For example, the memory may include an operating system that executes an application for organizing, monitoring, and controlling the drone fleet.

In one embodiment, the fog drone determines the types of drones in the fleet to accomplish the job. To do so, the fog drone may divide the job into a plurality of tasks or sub-jobs. If the job is laying power lines, the fog drone may divide the job into clearing the land, digging a trench, laying the power line, and covering the trench. The fog drone determines which type or types of drone are needed to complete the tasks—e.g., a bulldozer drone, trench digger drone, cable-laying drone, surveying drone, etc.

The fog drone may also determine the materials needed to accomplish the job. For example, if the job is to construct a building or plant a crop, the job may already inform the fog drone how much material is needed by providing blueprints or specifying the number of acres that need to be planted. In another example, the fog drone may perform preliminary analysis on the worksite to estimate the amount of material needed. The fog drone (if it is a UAV) may fly to the worksite and estimate the material needed. For example, if the job is laying a water pipe, but the area includes rock formations, the fog drone may need to plot a path that avoids the formations. Once this analysis is complete, the fog drone can determine the amount of material needed to perform the job.

Once the resources are identified (e.g., the types of drones and the amount of material required), the fog drone determines (e.g., estimates) the number of active and standby drones needed to complete the job at block 215. For example, if the fog drone estimates that the job requires one hundred feet of cable and a single cable-laying drone can lay fifty feet of cable before needing to restock, the fog drone may recruit two of these drones. Moreover, assuming that only one trench is dug at a time, the fog drone may indicate one of the cable-laying drones is active while the other is on standby. That way, once the first (active) drone finishes (or malfunctions), the second (standby) drone can replace the first drone so that work does not stop. In contrast, if the fog drone decides to start digging from both sides of the trench, the fog drone may recruit two active cable-laying drones while a third drone is recruited and placed on standby.

In one embodiment, the fog drone selects enough active and standby drones so that the job can be performed continuously during a set time period. For example, to run continuously until the job is complete, the fog drone may ensure each task or sub-job has a least one standby drone in case an active drone fails. However, because of noise restrictions, the fleet of drones may operate only during daytime hours. In this case, the fog drone ensures the member drones have sufficient standby drones and materials to operate during the day. During the night, the fog drone may release the drones or send the drones back to a home station to recharge, refuel, or collect more materials.

The fog drone may also consider the parameters or constraints when selecting the number of active and standby drones. For example, adding more drones to the fleet may mean the length of the job is reduced. Thus, the fog drone may add drones until an estimated time of completion is within the parameters provided by the user. On the other hand, adding more drones may increase the cost of executing the job. The fog drone may reduce the number of drones to reduce the cost, although this may result in the job taking longer to complete. In one embodiment, if the fog drone cannot determine a number of drones that would satisfy all the parameters (e.g., within a certain time and cost), the fog drone may send a message to the dispatcher which asks the user to adjust the parameters so the job can be completed.

Figure 3:
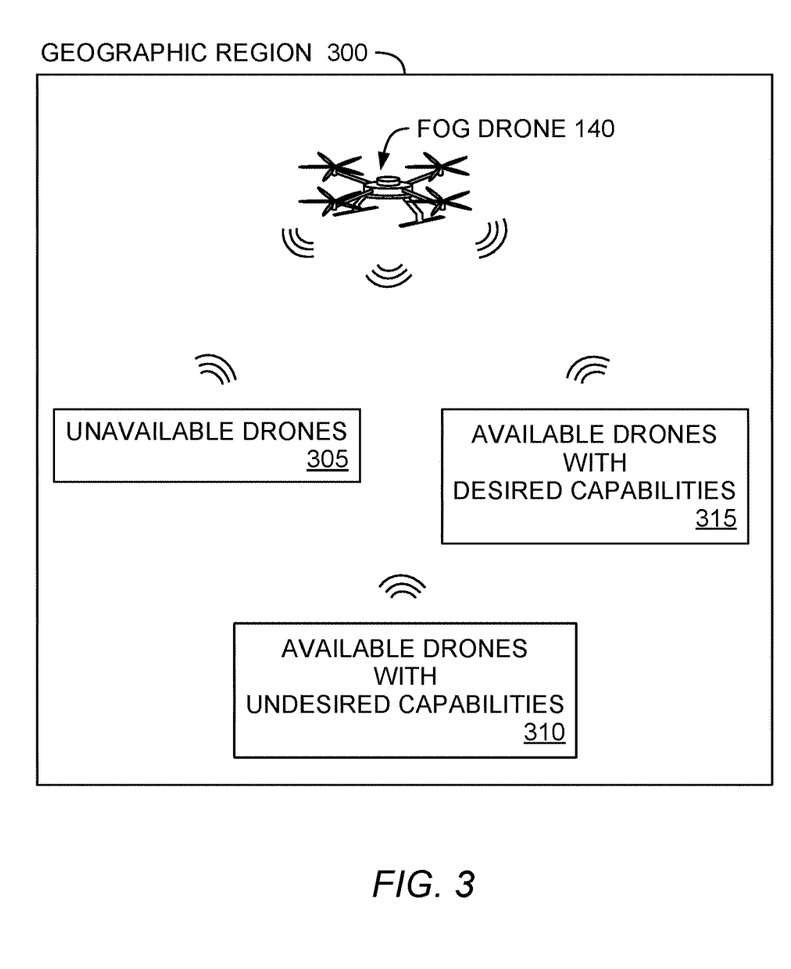
FIG. 3 illustrates a fog drone recruiting local drones, according to one embodiment described herein.

At block 220, the fog drone identifies availability and capability of local drones. FIG. 3 illustrates a fog drone 140 recruiting local drones, according to one embodiment described herein. As shown, FIG. 3 defines a geographic region 300 which includes the fog drone 140. Using one or more antennas, the fog drone 140 transmits advertising messages or queries to local drones within the range of its antenna in the geographic region 300. In one embodiment, the fog drone 140 first travels to a location that is near where the job is to be started or completed. For example, if the job is to move various types of building material to a job site, the fog drone 140 first moves to a location where the material is to be picked up before recruiting drones. Alternatively, if the job is to survey a property, the fog drone 140 may travel to the location of the property before identifying available drones in the region 300.

In region 300, three categories of drones respond to the advertisement transmitted by the fog drone 140. In one embodiment, the advertisement by the fog drone 140 may include a desired lease time indicating how long the drone will be working on the job as well as the different types of tasks that will be performed (which were identified at block 210 of method 200). Box 305 represents unavailable drones. These are drones that are already performing a different job during the lease time. For example, the drones may be currently allocated to a different fleet or cannot be leased for the duration requested by the fog drone. Put differently, the drone may be available only for the next half hour but the fog drone may need a drone for the next two hours. These drones may either not respond to the advertisement from the fog drone 140 or inform the fog drone 140 that they are in the region 300 but are unavailable.

Box 310 represents drones in region 300 that are available during the requested lease time but have undesired capabilities. For example, the fog drone 140 may want drones with RF hardware and antennas for extending the coverage of a cellular network but the drones 310 may be heavy lifting drones or construction drones that lack the requisite hardware.

Box 315 represents drones in region 300 that are available during the requested lease time and have the desired capabilities for completing the job. For example, when responding to the request, the drones represented by box 315 may indicate the amount of time they are available and their technical specifications. If these specifications help to accomplish the job, the fog drone 140 adds the drones to its fleet. In one embodiment, the fog drone 140 may add a drone to the fleet even if the drone is not available during the entire duration of the job. For example, if a drone is only available for one hour (but the job requires two hours), the fog drone may nonetheless add the drone and assign it as an active drone. Once the drone's availability expires, the fog drone releases the drone and uses another drone (which was on standby and may have a longer lease time) to replace the active drone.

In one embodiment, the fog drone incurs a cost by recruiting the drones to perform the job. The cost may be determined by an hourly rate for using the drone in the fleet. In one embodiment, the cost may be different if the drone is active or on standby. That is, a lower cost may be accrued for leasing the member drone when the drone is on standby than when the drone is actively being used to perform a job. Moreover, the costs for different drone types may vary. For example, it may be cheaper to lease a drone equipped to survey a property than a bulldozer drone for removing shrubs and small trees. As mentioned above, the fog drone 140 may evaluate the cost of leasing the drones to ensure it is within user-defined parameters.

In another embodiment, the fog drone 140 may recruit the drones at a location not related to the job. For example, the fog drone 140 may travel to a drone repository which provides a home base to multiple drones in order to recruit drones. Once the fleet is recruited, the fleet may travel as a group or individually to the location corresponding to the job.

Figure 4:
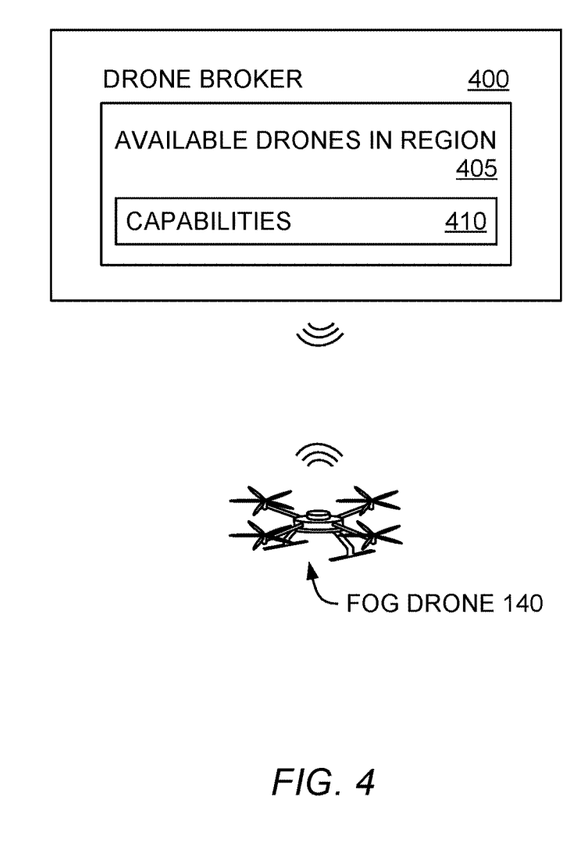
FIG. 4 illustrates a fog drone recruiting drones using a drone broker, according to one embodiment described herein.

FIG. 4 illustrates a fog drone 140 recruiting drones using a drone broker 400, according to one embodiment described herein. Rather than recruiting drones in a geographic region, in FIG. 4, the fog drone 140 relies on a drone broker 400 to identify available drones that are capable of accomplishing the job. In one embodiment, the drone broker 400 monitors the availability for a predefined number of drones. That is, instead of the fog drone 140 identifying available drones, this information is tracked by the drone broker 400.

After receiving a recruitment request from the fog drone 140, the drone broker 400 determines the drones 405 that are available during the requested lease time (or at least a portion of the duration of the job). Moreover, the drone broker 400 may determine if the available drones are near the region of the fog drone 140 or the location of the job. For example, the drone broker 400 may monitor drones in a very large region (e.g., using a network) and the fog drone 140 may be interested in leasing drones only with a predefined distance from the job location (e.g., within five kilometers).

The drone broker 400 evaluates the capabilities 410 of the available drones 405 to ensure they can perform a task required to complete the job. If so, the drone broker 400 informs the fog drone 140 that the drone can be leased—i.e., added to the fleet. Moreover, if there is a cost for leasing the drone, the drone broker 400 can monitor the amount of time the fog drone 140 leases the drone and bill the dispatcher. The drone broker 400 can also advertise a price the fog drone is willing to pay for the service and allow drones to accept (or reject) the price.

However, in one embodiment, the dispatcher might own all of the drones needed to accomplish the job, and dispatch those drones to the worksite immediately where they join the fleet. In this example, there is no need to query a third party (e.g., the drone broker 400) or for the fog drone to send out advertisements as shown in FIG. 3.

Returning to method 200, at block 225, the fog drone transmits invitations to available drones whose capabilities provide resources for completing the job. As shown in FIGS. 3 and 4, the fog drone may transmit a message to local drones or rely on a drone broker to identify suitable drones.

If at block 230 a drone accepts the invitation, the fog drone adds the drone to the fleet at block 235 thereby incurring a monetary cost for leasing the drones. However, if the drone does not accept the invitation, the fog drone searches for other drones to accomplish the job. For example, the fog drone may move to a different geographic region or reduce the number of desired drones in the fleet. As an example of the latter, the fog drone may want three digger drones but there may only be two available drones in the region. Instead of widening the search, the fog drone may decide to perform the job using only the two available drones.

Figure 5:
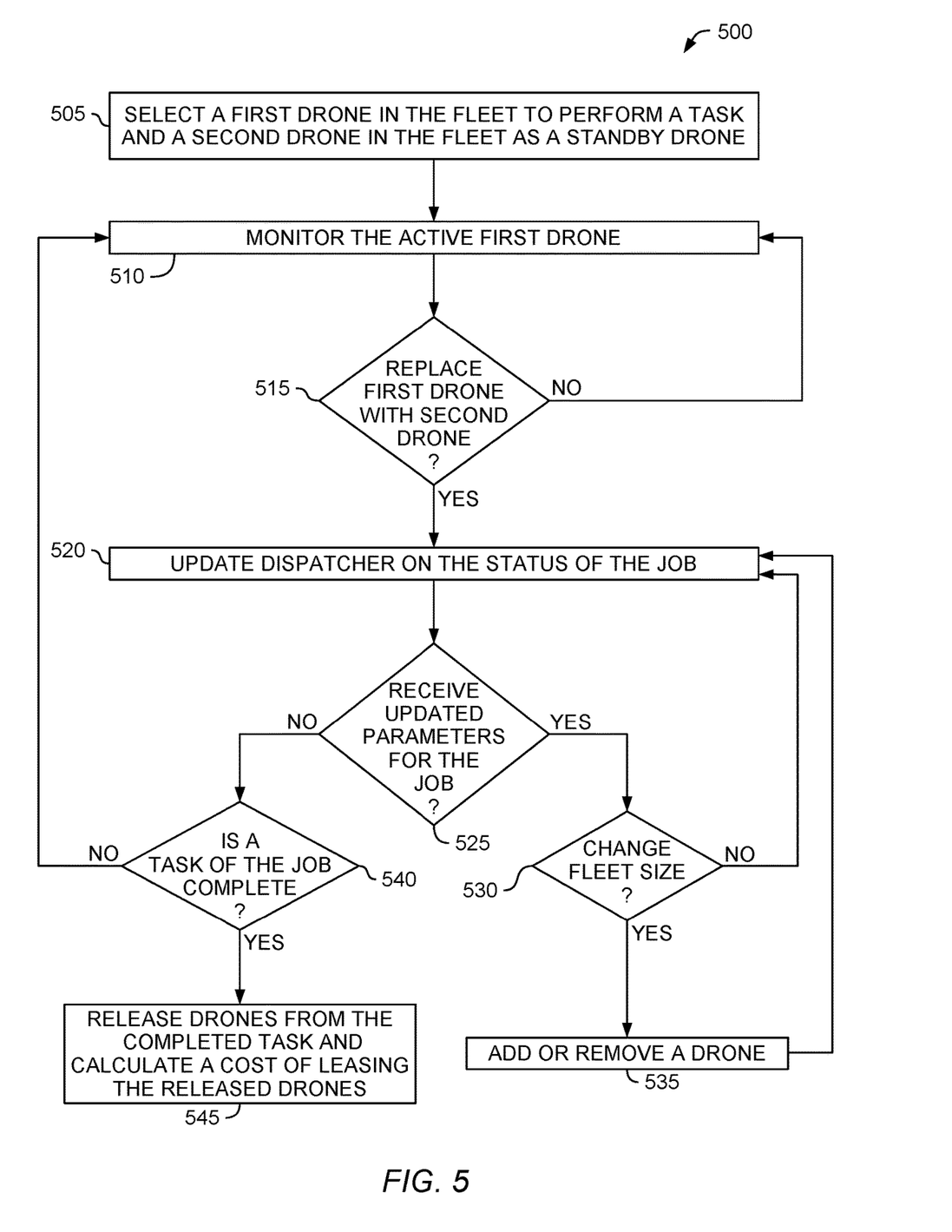
FIG. 5 is flowchart for controlling a drone fleet to complete a job, according to one embodiment described herein.

FIG. 5 is flowchart of a method 500 for controlling a drone fleet to complete a job, according to one embodiment described herein. In one embodiment, method 500 begins once the fog drone has assembled the drone fleet using, for example, method 200 in FIG. 2.

At block 505, the fog drone selects a first drone in the fleet to perform a task and a second drone (or multiple drones) in the fleet as a standby drone. In one embodiment, the fog drone places the member drones in either an active or standby state to ensure that the job is not halted if a drone runs out of material, needs to recharge/refuel, or malfunctions.

Figure 6:
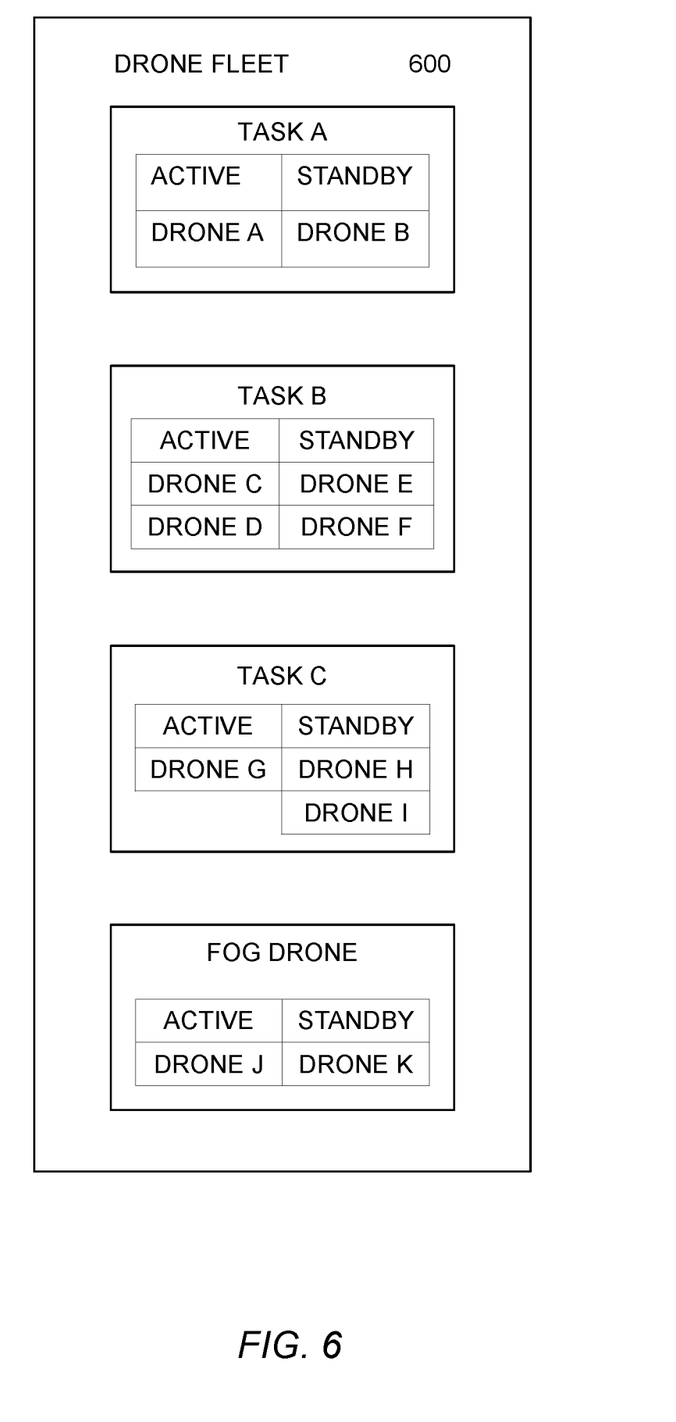
FIG. 6 illustrates drone assignments for completing a job, according to one embodiment described herein.

FIG. 6 illustrates drone assignments for completing a job, according to one embodiment described herein. In drone fleet 600, each drone is assigned to a particular task within the job. Although multiple tasks are shown, some jobs may not be subdivided into tasks. For example, if all the drones perform the same task, then the job may not be divided into a plurality of tasks. However, even the same task could be subdivided into small tasks. If the task is laying cable, multiple drones may lay cable at the same time but start at different locations along the route. The cable can then be connected once the drones have completed their portion of the route.

Using drone fleet 600 as an example, Task A may be surveying a property to determine the best location for an irrigation canal. Task B may be clearing trees and shrubbery from the path of the canal. Task C may be digging the canal once the land is cleared. In this example, the tasks may be performed sequentially or in parallel. For example, while a bulldozer drone is removing trees from the path (i.e., Task B), a trench digging drone can dig the canal in an area that was already cleared (i.e., Task C).

The drones assigned to each task are placed in either the active or standby states. The active drones (i.e., Drone A, Drone C, Drone D, etc.) are currently operating to perform the task. The standby drones, however, are not performing the task (i.e., Drone B, Drone E, Drone F, etc.). In one embodiment, the drones on standby are turned off or in a low power state at or near the location of the job. Although powered down, the standby drones may still be responsive to an instruction from the fog drone to power up and replace an active drone. In another embodiment, the standby drones may do other tasks so long as the drones can stop those tasks when asked by the fog drone to replace an active drone. For example, a standby drone may be used to do a non-essential task such as taking aerial pictures of the job or assist another job so long as the standby drone can stop this task when asked by the fog drone.

For Tasks A and B, there are an equal number of active drones and standby drones. However, for Task C there are two standby drones but only one active drone. For example, the drones performing Task C may have to refuel often, and as a result, the fog drone may assign additional standby drones. Moreover, the reverse can also be true where the fog drone assigns more active drones to a task than standby drones. For example, the fog drone may use only two drone when digging a ditch and assign a third drone to the standby state in case one of the two active drones needs to refuel or cease operating on the task for any reason.

Moreover, drone fleet 600 includes a standby drone for the fog drone. For example, the duration of the job may exceed the battery life of the active fog drone (i.e., Drone J). To ensure the job continues if Drone J must recharge, the drone fleets include Drone K on standby which has the necessary hardware and/or software applications, as well as the current status of the task, to function as the fog drone if the existing fog drone is unavailable for any reason.

Returning to method 500, at block 510, the fog drone monitors the active first drone to determine whether to replace the first drone with the standby second drone. In one embodiment, the fog drone receives status updates from the active first drone such as current battery (or fuel) level, malfunction alerts, amount of material carried by the drone, etc. The fog drone may ensure the battery level or fuel level of the first drone is above a threshold. Also, if the first drone carries material to perform its task (e.g., fiber optic cable or power line), the fog drone uses the status updates to monitor the supply of the material to determine when the drone has, or is about to, run out. Additionally, if the first drone malfunctions or a component breaks, the first drone may report the problem to the fog drone. In another example, the fog drone monitors the efficiency of the first drone which may decrease if a digging instrument or saw blade is dulled. If the efficiency falls below a predefined threshold, the fog drone replaces the active drone with a standby drone and sends the drone for repairs.

In one embodiment, the fog drone monitors the lease time for the first drone. For example, rather than leasing the drone for the entire job duration, the first drone may be leased for only a sub-portion of the time. Once the lease expires, the fog drone releases the first drone so that it can be assigned to a different fleet.

At block 515, the fog drone determines whether to replace the active first drone with the standby second drone. That is, based on the factors described at block 510, the fog drone determines if the second drone should be activated. If not, method 500 returns to block 510.

At block 520, the fog drone updates the dispatcher on the status of the job. Although this is shown in method 500 as occurring after replacing the active first drone with the standby drone, the fog drone may send updates to the dispatcher at predefined intervals or during other events. In one embodiment, the fog drone updates the dispatcher on the estimated time of completion which may change as the fog drone begins to execute the job. For example, the fog drone may detect adverse weather conditions, and in order to protect the fleet, order the drones to land (if UAVs) or seek shelter. Because the drones are not working, the weather can increase the estimated time for completing the task. In another example, if digging a trench, the drones may encounter rockier soil than anticipated which causes the trench digging drones to dig at a rate of one meter per hour rather than the estimated two meters per hour. Conversely, the fog drone may decrease the estimated time of completion if the weather is better than normal or if performing a task was easier than anticipated.

At block 525, the fog drone determines if the dispatcher transmits updated parameters for the job. After receiving the update from the fog drone, the dispatcher may forward the update to the user indicating the change in completion time. For example, if the completion time has increased, the user may give the dispatcher permission to increase the size of the fleet so that the job can be completed on time. The dispatcher forwards this parameter change to the fog drone.

In another example, if the job is on schedule to finish sooner than anticipated, the user may inform the dispatcher to reduce the cost of the job. That is, since the job is projected to complete sooner than expected, the dispatcher may instruct the fog drone to reduce cost even if that means the job will complete later. Moreover, even if the job estimation completion does not change, the user may nonetheless ask the dispatcher to finish the job sooner or reduce costs.

At block 530, the fog drone evaluates the parameters to determine if the fleet size should change. For example, to save costs, the fog drone may reduce the size of the fleet. Instead of using four drones to provide cellular network coverage, the fog drone may use only three. Conversely, if the user wants the job completed sooner, the fog drone may add more drones to the fleet. However, the fog drone may first perform an analysis to determine if adding the drones would improve the job completion estimate. For example, adding an additional survey drone may not speed up the job if one survey drone is sufficient. However, adding a second bulldozer drone may permit a path to be cleared from both directions which does reduce the job completion estimate.

Assuming the fleet size should change, at block 535, the fog drone adds or removes one or more drones in response to the updated parameters. After adjusting the size of the fleet, method 500 returns to block 520 where the fog drone updates the dispatcher on the status of the job. For example, the dispatcher can relay a new job completed estimation to the user who can again update the parameters if desired.

At block 540, the fog drone determines if a task of the job is complete. Referring to FIG. 6, if Drone A finishes Task A, the fog drone can release both Drones A and B from the fleet 600. However, if Tasks B and C are not complete, the fog drone keeps these drones in the fleet 600. In this manner, the fog drone can release member drones as individual tasks of the job are completed rather than releasing all the drones when the job is complete. If all the tasks are completed (i.e., the job is completed), the fog drone can release all the remaining drones.

In one embodiment, releasing the drones at block 545 ends the lease for the drone. For example, the released drone can return to its home base to refuel/recharge or to gather more materials. Moreover, the released drone can then be recruited into a different fleet. In one example, the fog drone may inform the drone broker that the member drone is free. Moreover, at block 545, the fog drone (or the drone broker) can calculate a cost for the lease based on a flat fee or the amount of time the drone was in the fleet which is billed to the dispatcher or the user.

In the preceding, reference is made to embodiments presented in this disclosure. However, the scope of the present disclosure is not limited to specific described embodiments. Instead, any combination of the features and elements herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An autonomous fog drone, comprising:
a processor; and
a memory comprising at least one application configured to perform an operation when executed by the processor, the operation comprising:
  receiving a job from a dispatcher;
  determining one or more drone types required for performing the job to be included within a drone fleet;
  determining a number of active drones and a number of standby drones of each drone type required for performing the job to be included within the drone fleet;
  transmitting, from the autonomous fog drone, a request to recruit drones to form the drone fleet based on the determined number of active drones and the determined number of standby drones of each drone type;
  adding a first drone and a second drone of a first type of the drone types to the drone fleet thereby incurring a monetary cost for leasing the first drone and the second drone, wherein the first drone and the second drone are controlled by the autonomous fog drone;
  assigning the first drone as an active drone to be operated to perform a first task of the job during a first period and the second drone as a standby drone not to be operated to perform the first task during the first period and the second drone as the active drone to be operated to perform the first task during a second period and the first drone as the standby drone not to be operated to perform the first task during the second period, wherein the second period is non-overlapping with the first period; and
  upon determining the first drone in the drone fleet is no longer needed, releasing the first drone from the drone fleet.

2. The autonomous fog drone of claim 1, wherein the operation further comprises:
receiving responses from the request from a plurality of drones within a range of an antenna on the fog autonomous drone;
determining availability of the plurality of drones for an estimated duration of the job; and
adding one of the plurality of drones to the drone fleet upon determining the one of the plurality of drones is available for the estimated duration of the job.

3. The autonomous fog drone of claim 2, wherein determining the one or more drone types comprises:
determining a drone capability required to complete the job, and wherein the operation further comprises:
determining, based on the received responses, whether the one of the plurality of drones has the drone capability; and
adding the one of the plurality of drones to the drone fleet upon determining the one of the plurality of drones has the drone capability.

4. The autonomous fog drone of claim 1, wherein the standby drone is in a low power state; and wherein the operation further comprises:
replacing the first drone with the second drone based on a status update received from the first drone.

5. The autonomous fog drone of claim 1, wherein the request is transmitted to a drone broker, wherein the drone broker determines availability for a plurality of drones and provides a lease to the autonomous fog drone for the first drone and the second drone.

6. The autonomous fog drone of claim 1, wherein the operation further comprises:
receiving a parameter from the dispatcher that constrains how the job is to be performed by the drone fleet, wherein the number of active drones and the number of standby drones of each drone type required for performing the job is determined based on the parameter.

7. The autonomous fog drone of claim 6, wherein the parameter is at least one of a time constraint indicating when the job should be completed by the drone fleet and a cost constraint indicating the total cost for completing the job.

8. The autonomous fog drone of claim 6, wherein the operation further comprises:
receiving update messages from the drone fleet when performing the job;
determining a time of completion of the job based on the update messages;
transmitting the estimated completion time to the dispatcher;
receiving an updated parameter for completing the job from the dispatcher; and
adjusting a size of the drone fleet based on the updated parameter.

9. A method of operating an autonomous fog drone, the method comprising:
receiving, at the autonomous fog drone, a job from a dispatcher;
determining, by the autonomous fog drone, one or more drone types required for performing the job to be included within a drone fleet;
estimating, by the autonomous fog drone, a number of active drones and a number of standby drones of each drone type required for performing the job to be included within the drone fleet;
transmitting, from the autonomous fog drone, a request to recruit drones to form the drone fleet based on the determined number of active drones and the determined number of standby drones of each drone type;
adding a first drone and a second drone of a first type of the drone types to the drone fleet thereby incurring a monetary cost for leasing the first drone and the second drone;
assigning the first drone as an active drone to be operated to perform a first task of the job during a first period and the second drone as a standby drone not to be operated to perform the first task during the first period and the second drone as the active drone to be operated to perform the first task during a second period and the first drone as the standby drone not to be operated to perform the first task during the second period, wherein the second period is non-overlapping with the first period; and
determining, by the autonomous fog drone, the first drone in the drone fleet is no longer needed, and releasing the first drone from the drone fleet.

10. The method of claim 9, further comprising:
receiving responses from the request from a plurality of drones within a range of an antenna on the autonomous fog drone;
determining availability of the plurality of drones for an estimated duration of the job; and
adding one of the plurality of drones to the drone fleet upon determining the one of the plurality of drones is available for the estimated duration of the job.

11. The method of claim 10, wherein determining the one or more drone types comprises:
determining a drone capability required to complete the job, wherein the method further comprises
determining, based on the received responses, whether the one of the plurality of drones has the drone capability; and
adding the one of the plurality of drones to the drone fleet upon determining the one of the plurality of drones has the drone capability.

12. The method of claim 9, wherein the standby drone is in a low power state, and wherein the method further comprises:
replacing the first drone with the second drone based on a status update received from the first drone.

13. The method of claim 9, wherein the request is transmitted to a drone broker, wherein the drone broker determines availability for a plurality of drones and provides a lease to the autonomous fog drone for the first drone and the second drone.

14. The method of claim 9, further comprising:
receiving a parameter from the dispatcher that constrains how the job is to be performed by the drone fleet, wherein the number of active drones and the number of standby drones of each drone type required for performing the job is determined based on the parameter.

15. The method of claim 14, wherein the parameter is at least one of a time constraint indicating when the job should be completed by the drone fleet and a cost constraint indicating the total cost for completing the job.

16. The method of claim 14, further comprising:
receiving update messages from the drone fleet when performing the job;
estimating a time of completion of the job based on the update messages;
transmitting the estimated completion time to the dispatcher;
receiving an updated parameter for completing the job from the dispatcher; and adjusting a size of the drone fleet based on the updated parameter.

17. A system, comprising:
a drone fleet comprising a plurality of autonomous drones; and
an autonomous fog drone communicatively coupled with each of the plurality of autonomous drones of the drone fleet, and configured to monitor and control each of the plurality of autonomous drones of the drone fleet, wherein the autonomous fog drone is further configured to:
receive a job from a dispatcher;
determine one or more drone types required for performing the job to be included within the drone fleet;
determine a number of active drones and a number of standby drones of each drone type required for performing the job to be included within the drone fleet;
transmit a request to recruit drones to form the drone fleet based on the determined number of active drones and the determined number of standby drones of each drone type;
add a first drone and a second drone of a first type of the drone types to the drone fleet thereby incurring a monetary cost for leasing the first drone and the second drone;
assign the first drone as an active drone to be operated to perform a first task of the job during a first period and the second drone as a standby drone not to be operated to perform the first task during the first period and the second drone as the active drone to be operated to perform the first task during a second period and the first drone as the standby drone not to be operated to perform the first task during the second period, wherein the second period is non-overlapping with the first period; and
upon determining the first drone in the drone fleet is no longer needed, releasing the first drone from the drone fleet.

18. The system of claim 17, wherein the autonomous fog drone is further configured to:
receive responses from the request from a plurality of unleased drones within a range of an antenna on the autonomous fog drone;
determine availability of the plurality of unleased drones for an estimated duration of the job; and
add one of the plurality of unleased drones to the drone fleet upon determining the one of the plurality of unleased drones is available for the estimated duration of the job.

19. The system of claim 17, wherein each of the plurality of autonomous drones are leased by the autonomous fog drone for respective periods of time.

20. The system of claim 17, wherein the autonomous fog drone is further configured to:
receive a parameter from the dispatcher that constrains how the job is to be performed by the drone fleet,
wherein the number of active drones and the number of standby drones of each drone type required for performing the job is determined based on the parameter.

* * * * *